May 27, 1924.

J. D. LEWIS 1,495,420

INDUCTION MOTOR

Original Filed May 20, 1918   7 Sheets-Sheet 1

INVENTOR
Jacob D. Lewis
BY
Kenyon & Kenyon
ATTORNEYS

May 27, 1924. 1,495,420
J. D. LEWIS
INDUCTION MOTOR
Original Filed May 20, 1918 7 Sheets-Sheet 2

INVENTOR
Jacob D. Lewis
BY
Kenyon & Kenyon
ATTORNEYS

May 27, 1924.

J. D. LEWIS 1,495,420

INDUCTION MOTOR

Original Filed May 20, 1918    7 Sheets-Sheet 4

INVENTOR
Jacob D. Lewis
BY
Kenyon & Kenyon
ATTORNEYS

May 27, 1924.
J. D. LEWIS
INDUCTION MOTOR
Original Filed May 20, 1918   7 Sheets-Sheet 5
Fig.5.
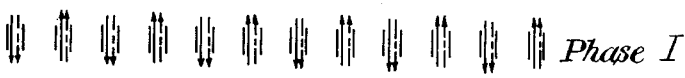
Fig.6.
Fig.7.
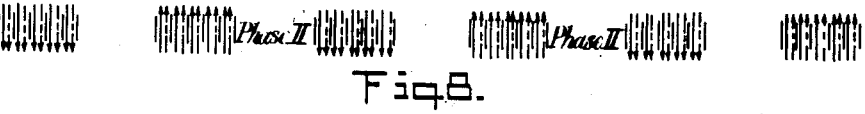
Fig.8.
Fig.9.
INVENTOR
Jacob D. Lewis
BY
Kenyon & Kenyon
ATTORNEYS May 27, 1924.
J. D. LEWIS
INDUCTION MOTOR
Original Filed May 20, 1918    7 Sheets-Sheet 6
1,495,420
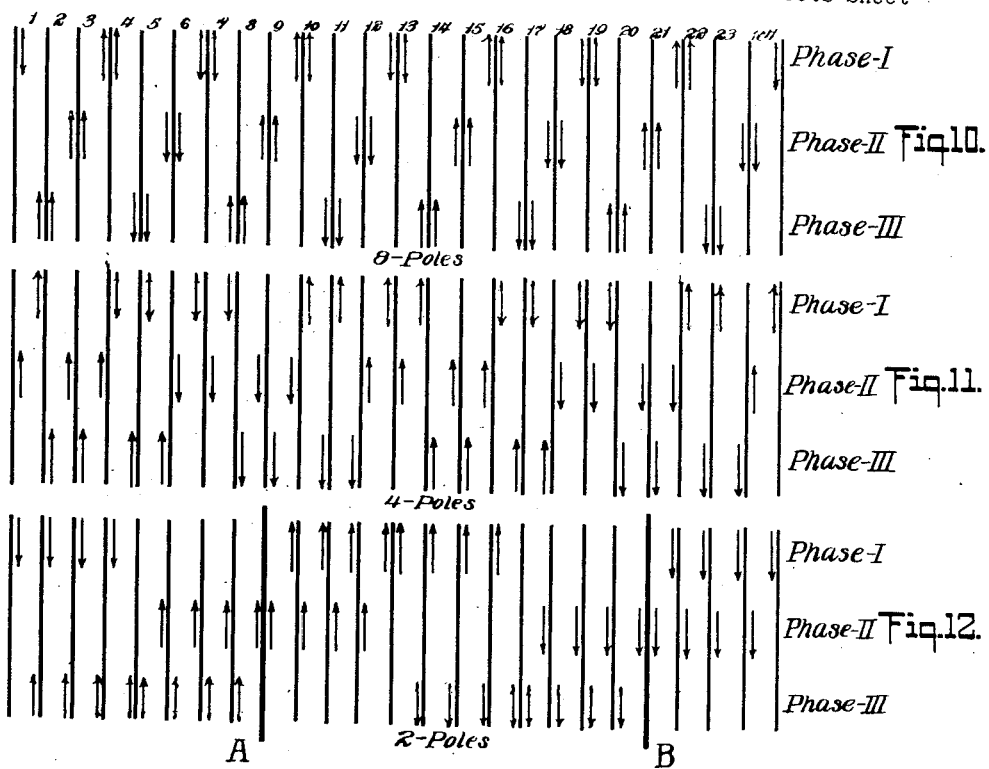
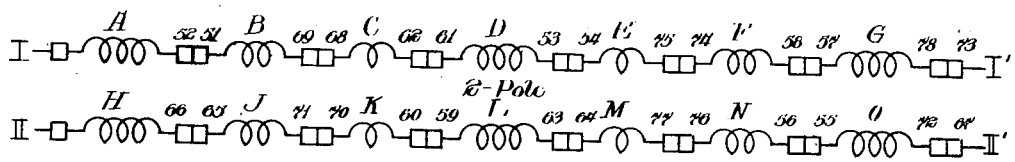
Fig.15.
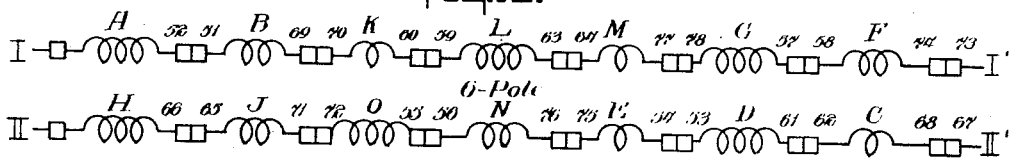
Fig.16.
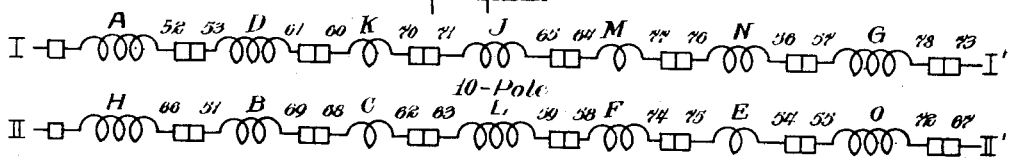
Fig.17.
INVENTOR
Jacob D. Lewis
BY
Kenyon & Kenyon
ATTORNEYS

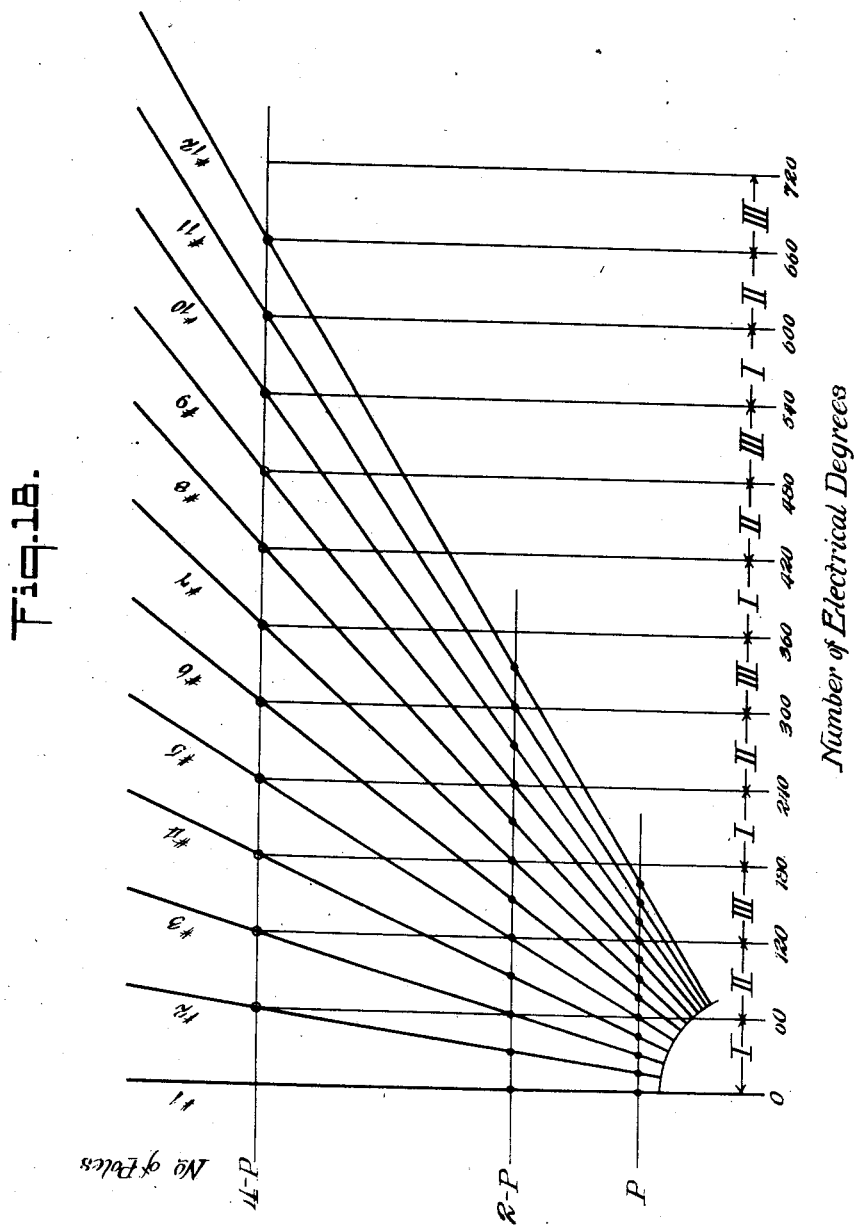

Patented May 27, 1924.

1,495,420

UNITED STATES PATENT OFFICE.

JACOB D. LEWIS, OF YONKERS, NEW YORK, ASSIGNOR TO OTIS ELEVATOR COMPANY, A CORPORATION OF NEW JERSEY.

INDUCTION MOTOR.

Original application filed May 20, 1918, Serial No. 235,475. Divided and this application filed October 27, 1919. Serial No. 333,490.

*To all whom it may concern:*

Be it known that I, JACOB D. LEWIS, a citizen of the United States, residing at Yonkers, in the county of Westchester and State of New York, have invented certain new and useful Improvements in Induction Motors, of which the following is a specification.

My invention relates to alternating current induction motors more particularly to an induction motor with a single stator winding disposed and arranged in such a manner and with such a method of connection that the motor can be successfully connected in different relations to produce different pole numbers, the larger pole number being an integral multiple of the smaller pole number, each phase in the pole number occupying a space equal to the width of the pole divided by the number of phases, and each phase electrically spaced apart from each other by an angle of 360° divided by the number of phases, and all conductors being so disposed that they remain fully effective for all pole numbers, whereby for all pole numbers the winding produces symmetrical poles substantially in the same or similar manner as the usual single speed induction motor wound for a like number of poles and the same number of phases. In changing from one number of poles to another, the connections are made in such a way that the number of effective turns per phase are varied and the variation will produce substantially the same torque of the motor for the various sets of pole numbers when provided with power from the same impressed electro-motive force without changing either the voltage impressed or number of phases. In the prior state of the art some of the results above referred to may have been partially accomplished for one winding for one set of pole numbers, but not all of the results for all pole numbers. In other cases a compromise is made, in which the windings for all pole numbers are more or less irregular and ineffective, and without producing completely all of the characteristics and results of a single speed induction motor for all pole numbers, nor is the winding capable of utilization with the same degree of efficiency as in a single speed induction motor and at the same time maintain the torque of the motor for different pole numbers without changing the number of phases or the impressed electromotive force. My invention also relates particularly to the manner of grouping the conductors and the means and method of varying the connection of the groups of conductors to secure variation in the number of poles with a consequent variation in the speed of the motor, and especially to an alternating current induction motor provided with drum windings.

It is an object of my invention to combine the conductors into coils and the coils into groups in certain cases and provide means for varying the connection of coils and groups in such a manner as to secure as high efficiency as possible at different speeds of the motor, and to secure the same performance of the motor at different speeds as would be obtained in corresponding single speed motors having the same respective speeds.

This application discloses certain features disclosed in my co-pending application Serial No. 235,475, filed May 20, 1918 for induction motors and constitutes a continuation thereof.

In order to vary the motor speed the number of poles must be changed, and with this change occurs a change in the pole pitch, assuming the frequency remains unchanged, although it always includes 180 electrical degrees. In order to reduce the number of conductors and switches necessary for changing the number of the poles, and in order to satisfy practical requirements of construction, it is highly desirable to combine the conductors into coils and the coils into groups. But it is obvious that the same coil pitch will not produce the same operating condition at different speeds for all speed ratios. In single speed motors of the class described it is usual to connect conductors associated with a north pole with conductors occupying a given position under an adjacent south pole, but the same result is obtained if conductors under a north pole are connected with conductors occupying the given position under any south pole whether or not it is adjacent. The distance between the centers of adjacent poles being 180 electrical degrees, the performance of the motor will remain the same if a given conductor associated with a north pole is connected to a conductor occupying a given position with relation to any south pole distant from the north pole $(2n+1) \times 180$ electrical degrees where $n$ is any integer; wherein the number of times 180 electrical degrees are passed over is represented by $2n+1$, where $n$ equals zero or any integer.

It is apparent that if the coil pitch is shorter than the pole pitch, the coil will embrace only a portion of the flux of that pole, and if its pitch is longer than that of the pole it will have some of the flux of the next pole passing through it and in a sense neutralizing the flux of the pole to which it belongs so that if the coil pitch is short for one speed, a given amount, and long for another speed, the same amount, the same effective flux will pass through it and it will be equally effective at both speeds, and compensation by additional turns for shortness is the same as for excess of length of the coil. Thus it appears that where the coil pitch is different from the pole pitch, the difference may be either that the coil is shorter or longer than the pole pitch; that the same compensation is effective for a given amount of shortness or excess of length; and also that the performance of the motor will remain the same whether the coil pitch is longer or shorter than the pole pitch, and also when the coil, in addition, spans $2n \times 180$ electrical degrees where $n$ is any integer regardless of whether or not $n$ has the same value at different speeds so long as the difference between coil pitch and pole pitch is the same in value at different speeds, regardless of whether that difference is positive or negative, i. e. regardless of whether it represents shortness or excess of length.

I, therefore, determine the ratio of the coil pitch to the pole pitch for a given speed which will cause the coil to be acted upon by the same or equivalent electrical degrees of pole face at another speed. This condition must be complied with in order to secure the same performance at the different speeds as that obtained in corresponding single speed motors of the same respective speeds, because compensation must be made in a coil for differences between its pitch and the pole pitch by varying the number of its turns, and, therefore, the coil pitch must be so chosen that compensation made in it for one pole pitch or speed will have the same effect at another speed. Conversely if the speeds or numbers of poles are chosen, the ratio of coil pitch to pole pitch is calculated at which the difference between coil pitch and pole pitch will be the same in value, though it may be either negative or positive, at all speeds. It is not practical to change the number of turns per coil in changing speed.

Let
$P_1$ = a lower number of poles.
$P_2$ = a higher number of poles.
$S$ = the total number of stator slots.
$K$ = the number of stator slots to be embraced by the coil.
$\pm \Theta$ = the electrical degrees difference between the pole pitch and the coil pitch.
$n$ = any integer.
$\pi$ = radians per pole.

Then
$$\frac{P_1 \pi K}{S} = \pi \pm \Theta$$

and
$$\frac{P_2 \pi K}{S} = (2n+1)\pi \pm \Theta$$

eliminating $\Theta$ using the minus sign which indicates that the coil is to be short for both numbers of poles.

$$\frac{K}{\frac{S}{P_1}} = \frac{2n}{\frac{P_2}{P_1} - 1} \quad (1)$$

$\frac{K}{\frac{S}{P_1}}$ = the ratio of the number of slots embraced by the coil to the number of slots constituting one of the lower number of poles $P_1$.

Likewise when the coil is $\Theta$ degrees short for $P_1$ poles and $\Theta$ degrees long for $P_2$ poles.

$$\frac{K}{\frac{S}{P_1}} = \frac{2(n+1)}{\frac{P_2}{P_1} + 1} \quad (2)$$

Substituting in these two equations the values of 0, 1, 2 and 3 for $n$, and various values of $\frac{P_2}{P_1}$ the following values of the ratio of the coil pitch to the pole pitch are obtained Equation #1.
Coil short for both pole numbers.

| $\frac{P_2}{P_1}$ | $\frac{K}{\frac{S}{P_1}}$ |
|---|---|
| 2 | 2, 4, 6 |
| 3 | 1, 2, 3 |
| 4 | $\frac{2}{3}, \frac{4}{3}, 2$ |
| 5 | $\frac{1}{2}, 1, 1\frac{1}{2}$ |
| 6 | $\frac{2}{5}, \frac{4}{5}, \frac{6}{5}$ |
| 7 | $\frac{1}{3}, \frac{2}{3}, 1$ |
| 8 | $\frac{2}{7}, \frac{4}{7}, \frac{6}{7}$ |
| 9 | $\frac{1}{4}, \frac{1}{2}, \frac{3}{4}, 1$ |

Equation #2.

| Coil long for higher pole number and short for lower pole number. | | |
|---|---|---|
| | 2 | $\frac{2}{3}, \frac{4}{3}, 2, \frac{8}{3}$ |
| | 3 | $\frac{1}{2}, 1, \frac{3}{2}, 2$ |
| | 4 | $\frac{2}{5}, \frac{4}{5}, \frac{6}{5}, \frac{8}{5}$ |
| | 5 | $\frac{1}{3}, \frac{2}{3}, 1, \frac{4}{3}$ |
| | 6 | $\frac{2}{7}, \frac{4}{7}, \frac{6}{7}, \frac{8}{7}$ |
| | 7 | $\frac{1}{4}, \frac{1}{2}, \frac{3}{4}, 1$ |
| | 8 | $\frac{2}{9}, \frac{4}{9}, \frac{2}{3}, \frac{8}{9}$ |
| | 9 | $\frac{1}{5}, \frac{2}{5}, \frac{3}{5}, \frac{4}{5}, 1$ |

Upon examination of these values of the ratio of the coil pitch to the pole pitch for the lowest number of poles the results obtained from both equations show that the ratio of coil pitch to pole pitch is equal to 1, or in other words $\Theta=0$, for the speed ratios 3, 5, 7 and 9. From this it follows that making the coil pitch equal to the pole pitch for the lowest number of poles will make it possible so to connect the coils that there will be produced the equivalent of a full pitch coil for all of the speed ratios named.

Further examination of the values of the ratio of coil pitch to pole pitch shows that when the coil length is made equal to two-thirds of the length of the pole for the lowest number of poles the speed ratios 2, 4, 5, 7 and 8 may be obtained. This examination also shows that to secure the speed ratio of 2, the coils must be longer than the pole for one speed and shorter for the other speed than the pole, because the value of coil length to pole length for the speed ratio 2 is obtained by the second equation which is premised upon these conditions. The same conditions holds for the speed ratios of 5 and 8, but the coil may be short for both speeds when the ratios 4 and 7 are desired as these values of the ratio of coil length to pole length are obtained by equation 1. In other words, I have ascertained that full pitch coils—namely those in which the ratio of coil length to pole length is equal to 1, and $\Theta$ is equal to zero—may be used to secure the same performance in motors having speed ratios 3, 5, 7 and 9, as that of similar single speed motors of the same respective speeds where pole pitch equals coil pitch; and that if a coil two-thirds as long as the pole is used the same performance may be secured where the speed ratios are 2, 4, 8, etc., as that of single speed motors having respectively the same speeds where coil pitch equals $\frac{2}{3}$ or $\frac{4}{3}$ pole pitch.

Another feature to be considered is the arrangement of the conductors along the pole face. The most desirable arrangement is that wherein the greatest magnetizing effect is obtained and in which the least magnetic leakage will occur, from a given number of ampere conductors per slot. To this end it is desirable to have in a single slot, considering an instantaneous condition, only conductors of the same phase or an equivalent arrangement and to have the conductors of each phase distributed across its own proper proportion of the pole face. In other words, in a three phase motor conductors of each phase should occupy and be positioned entirely within 60 electrical degrees of the pole face.

Thus it is seen that the effect of each phase in producing poles is confined to its proper proportion of the pole face by locating the conductors of that phase in that proportion of the pole face. However, where it is impossible for practical reasons to confine conductors of a phase to the proper proportion of the pole face, nevertheless the effects of the various phases may be combined to produce as many resultant effects as there are phases the resultants being as many electrical degrees apart as the phases of the source of supply and each resultant can be confined, considering an instantaneous condition, to its proper proportion of the pole face by associating within that proportion conductors of one phase with conductors of only one other phase so as to produce the desired resultant phase effect within that proportion, as in single speed motors of the same respective speeds with long or short pitch coils.

The manner in which I have secured the above results and other and further advantages of my invention will appear from the following description taken in connection with the accompanying drawings, and will be pointed out in the appended claims.

Figs. 5 and 6 are charts showing the arrangement of phases for different speeds in the windings shown in Fig. 2.

Figs. 7, 8 and 9 are charts showing the arrangement of phases in the different slots for the different speeds for motor diagrammatically shown in Fig. 3.

Figs. 10, 11 and 12 are charts showing the arrangement of conductors and slots for the different speeds of the motor shown in Fig. 4.

Figs. 15, 16 and 17 show the connections for the motor shown in Fig. 3, for different speeds.

Fig. 18 is a diagram showing the manner of changing connection of the groups of coils of the motor shown in Fig. 4.

Figure 1:
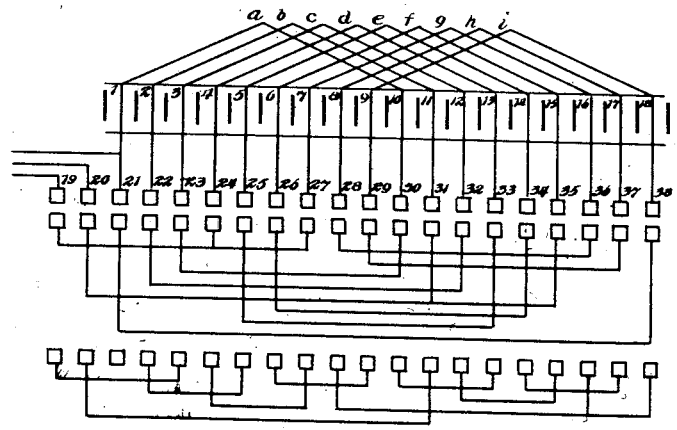
Fig. 1 is a diagrammatic showing of the windings of a three phase motor with a 3 to 1 speed ratio embodying certain features of my invention.

Fig. 1 shows diagrammatically the windings of a three phase motor with conductors brought out from certain coils or groups of coils together with two controller or switch arrangements, which when substituted one for the other change the number of poles from two to six, giving the speed ratio of 3. The upper controller arrangement places the first three conductors in the first phase, the second three in the second phase, and the third three in the third phase, and so on.

The lower controller arrangement places the first conductor in the first phase, the second in the second phase, the third in the third phase, and so on. The connections are clearly shown in Figs. 13 and 14. It is to be noted that there are two sets of corresponding coil sides, the coil sides in slots 1 to 9 inclusive forming one set and the coil sides in slots 10 to 18 inclusive forming the other set. In other words, considering each coil separately, the corresponding coil sides are those that are toward the same hand of the observer in viewing the drawing.

Figure 2:
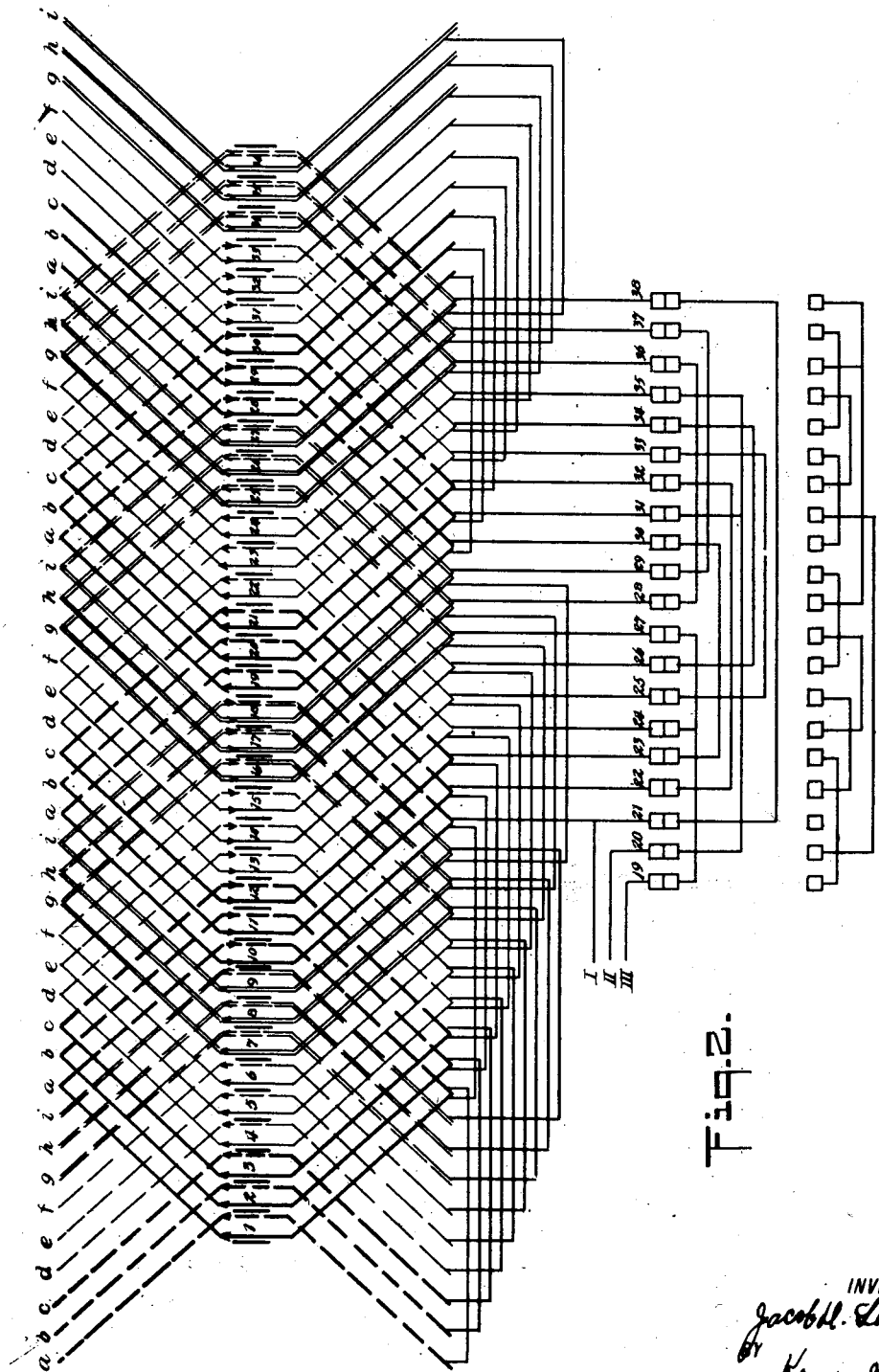
Fig. 2 is a diagrammatic showing of the windings of a three phase motor with a 3 to 1 speed reduction and having overlapping coils.

In the arrangement shown in Fig. 2 I have gained the advantage of having overlapping coils whereby two coil sides are positioned in the same slot. The upper controller arrangement gives four poles and the lower controller arrangement gives 12 poles. The three phases are indicated respectively by heavy, light and double lines.

It will be noticed in both Figs. 1 and 2 that at both speeds the coils embrace the entire poles or the equivalent thereof. That is, for a given coil it makes no difference whether the coil sides occupy the same relative position in connection with adjacent poles or poles $2n+1$ poles apart.

I have also provided an arrangement wherein at all speeds only coil sides of the same phase, with the same current direction, are positioned in the same slot and each phase lies within and is distributed uniformly across its proper proportion—namely 60 electrical degrees of the pole face.

These facts clearly appear from the phase charts shown in Figs. 5 and 6 for the different speeds of the motor shown in Fig. 2 where the upper coil side in each slot is indicated by a solid line and the lower by a broken line.

It will be noted that the same number of conductors are brought out to the controller in both Figs. 1 and 2 although the number of coils is increased and they are arranged to overlap. This result is obtained by proper grouping as to the coils shown in said figures. To describe the grouping of the coils by which the same number of conductors is brought out in each of said Figures 1 and 2, it may be explained that in each of these figures there is a total number of nine groups of coils, three groups of which, having reference to pole numbers, are placed in one phase for one pole number; another three groups in another phase for that same pole number; and the remaining three groups in still another phase for that same pole number. For a different pole number, the same nine groups of conductors are used; three groups of which are placed in one phase, for that pole number, another three groups are placed in another phase for that same pole number, and so on, as first above related. It will be seen that there are nine groups in all, divided into three groups per phase for both pole numbers. For convenient illustrations of the above described arrangements see for example, the 4-pole number, Figure 1, and the 12-pole number, Figure 2. In two of the individual nine groups, i. e., groups, $a$ and $i$, the current in both said groups, $a$ and $i$, is in the same direction, and the phase is the same, for both pole numbers; in four of the other individual groups, i. e., groups $b$, $c$. $g$ and $h$, the current in all four said groups is in the same direction, but said groups are placed in different phases for the two different pole numbers; in still two others of said individual groups, i. e., groups $d$ and $f$, the direction of the current in one of them is opposite to the direction of the current in the other one of them, but said groups are placed one in one phase for one pole number and the other in a different phase for the other pole number; and in one other individual group, i. e., group $e$, the direction of the current changes or is opposite, but is placed in the same phase, for different pole numbers. It may be written that the above description as to the groupings comprehends all of the coils, which may be conveniently seen in Figures 13 and 14.

If it is desired, for certain conditions of load, to maintain the torque approximately constant at various speeds, the air gap density must remain the same even though the speed is changed. An increase of speed will, under such conditions, produce a proportional increase of counter electromotive force per coil. To secure the same flux density in the air gap the counter electromotive force per phase must remain the same for each speed and, therefore, the number of coils connected in series across each phase must be decreased in the same proportion as the speed is increased. In other words, an increase of the pole pitch due to a change of speed requires approximately the same proportional decrease in a number of coils in series across a line to maintain the air gap density the same because of the change in the counter electromotive force following the change of speed.

This general statement is based upon the assumption that there is no change in magnetic leakage when the number of poles is changed. The maintenance of constant torque or horse power is a matter of excitation and within my invention either delta or Y connection may be used with or without parallel circuits depending upon whether the impressed electromotive force is constant or derived from a transformer with various voltage taps.

Figure 13:
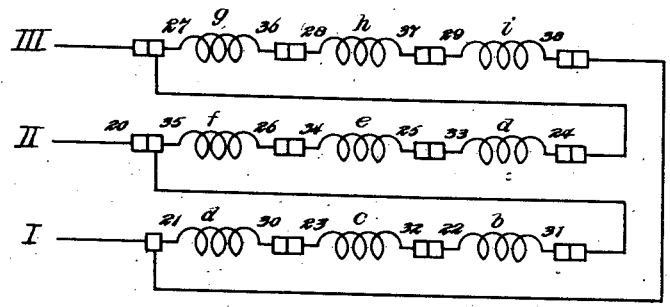
Figs. 13 and 14 show the connection for the motor shown in Fig. 1.
Figure 14:
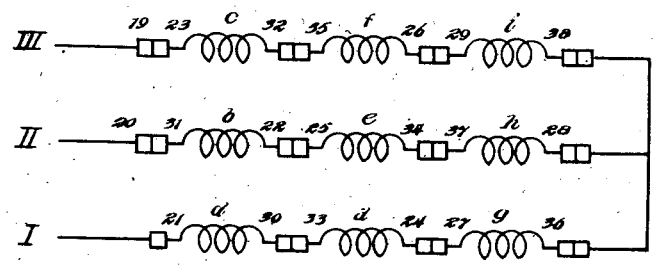

In chainging from two poles to six poles in Figs. 1, 13 and 14, the change is made from the delta to the Y connection in order to secure at least approximately this same result and maintain air gap density approximately constant. The variation in the losses due to a change of the number of poles assists in securing this result. This change of connections does not result in a change as to the flux per pole in the ratio of 3:1 but with fewer poles the leakage is less and the excitation is therefore practically changed in ratio 3:1. Excessive saturation of the iron of the stator is avoided by designing it for the lowest number of poles.

Figure 3:
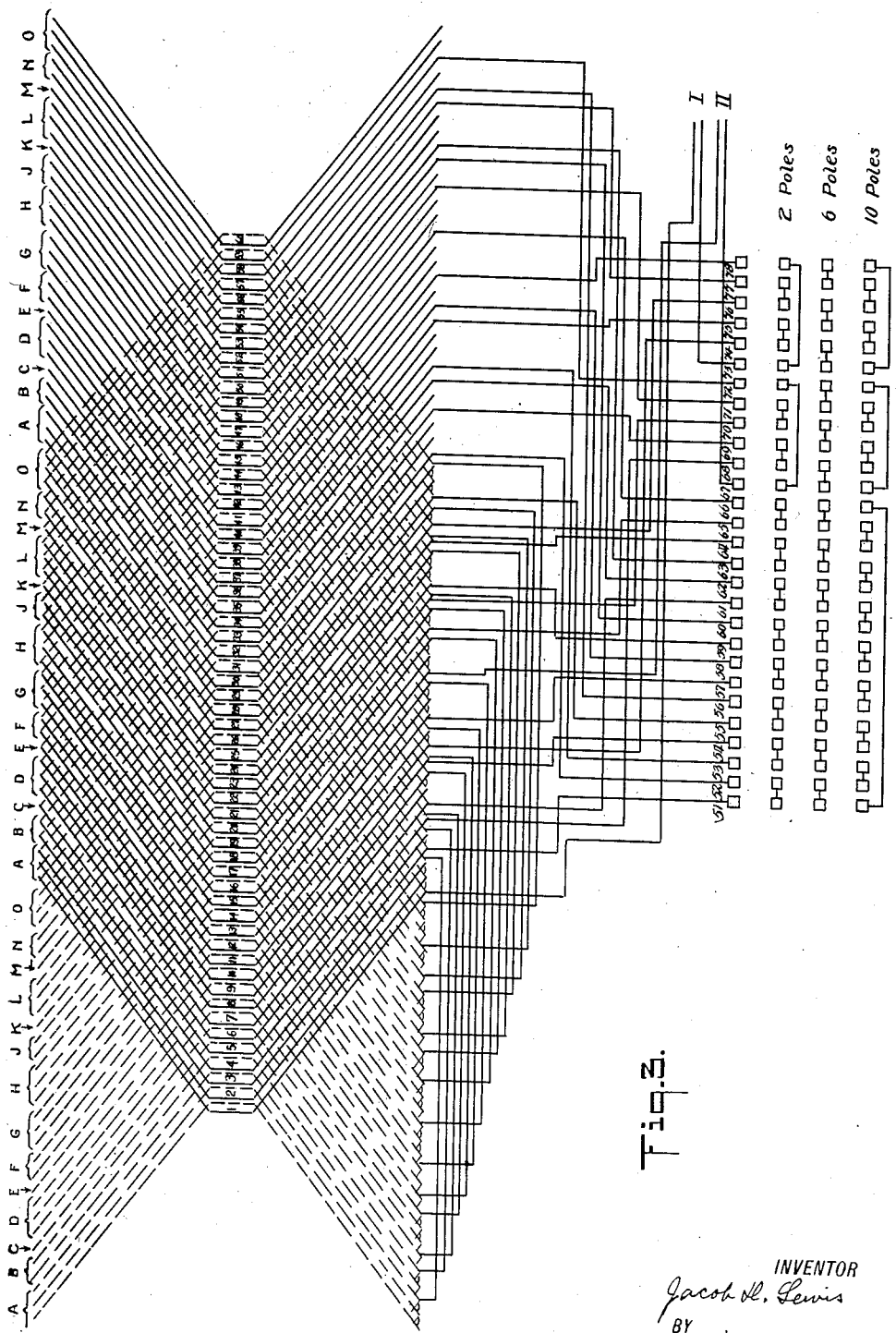
Fig. 3 is a diagrammatic showing of the windings of a two phase motor embodying certain features of my invention having speed ratios of 1, 3 and 5.

Figure 3 shows a two phase winding together with controller arrangements producing 2, 6 and 10 poles giving speed ratios of 1, 3 and 5; the coils being arranged to overlap and placed in groups so as to reduce the number of conductors coming out to the controller. The connection for different speeds of this motor are shown in Figs. 15, 16 and 17.

Referring to the phase charts of this motor for different speeds, Figs. 7, 8 and 9, it will be seen that in the arrangement shown in Fig. 3 only conductors of the same phase with current in the same direction occupy the same slot and the conductors are properly distributed across the pole face at all speeds so that each of the two phases is confined to 90 electrical degrees of the pole face. Figs. 3, 7, 8 and 9 are correspondingly numbered and lettered to facilitate location of corresponding parts.

Figure 4:
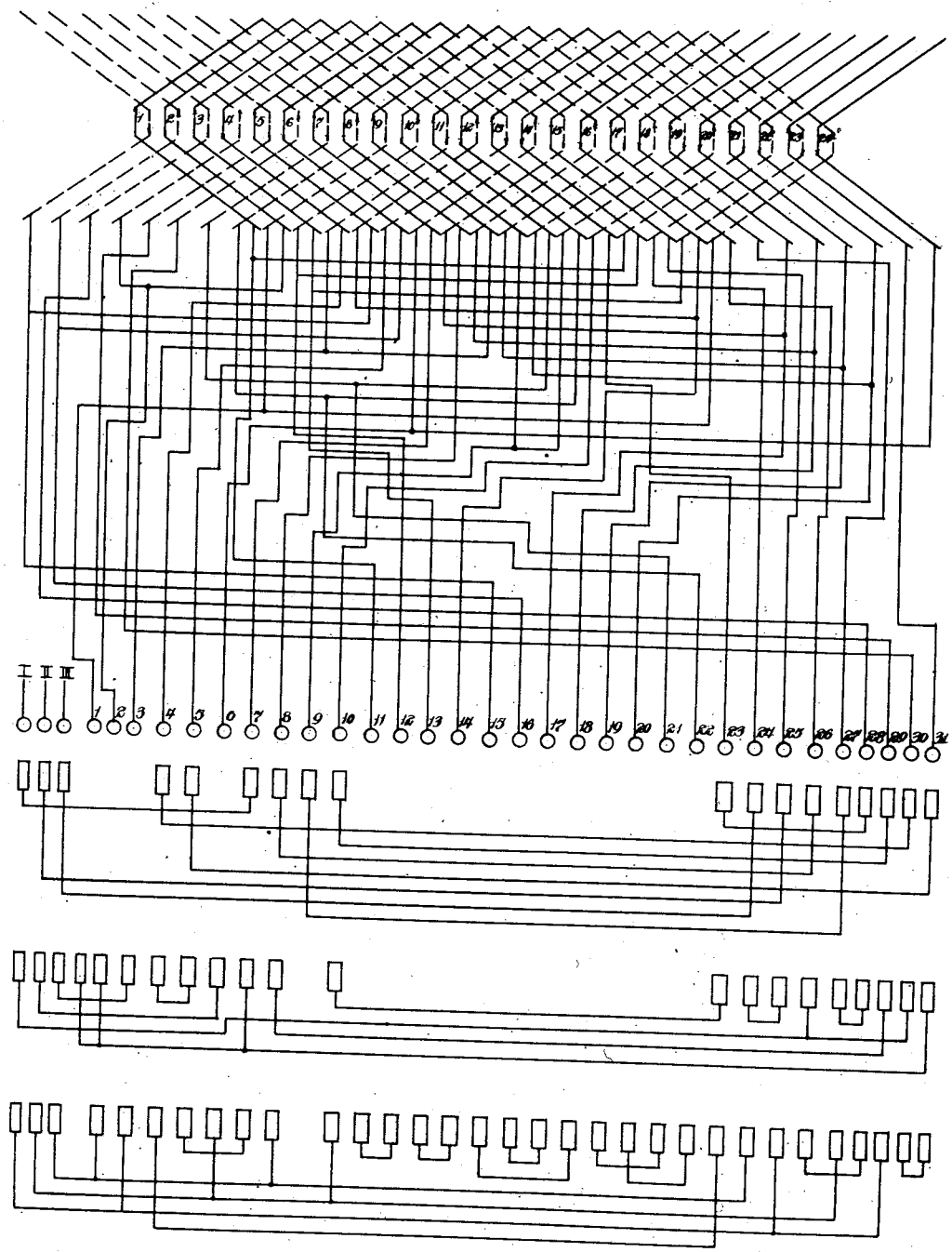
Fig. 4 is a diagrammatic showing of the windings of a motor embodying the features of my invention and having the speed ratios of 1, 2 and 4.

In Fig. 4 I have shown a winding for a motor wherein 8 poles connected in a Y connection with all coils of each branch of the Y connection in series are secured by the upper controller arrangement. Four poles in a Y connection with each branch of the Y comprising two circuits in parallel is obtained from the second controller arrangement and 2 poles in the delta connection in which each branch comprises two circuits in parallel is obtained by the lowest controller arrangement.

In the arrangement shown the coils are 60° short for 2 poles, 60° long for 4 poles and 60° short for 8 poles. Thus at all speeds each coil embraces the same or equivalent electrical degrees. In other words, the flux of 120 electrical degrees of the pole face is effective upon each coil at all speeds. In changing from 8 poles to 4 poles the pole area doubles, so I have changed the connection of each branch of the Y-connected circuit from a series connection of the coils to a connection in which each branch of the Y comprises two circuits in parallel in order to secure twice the flux per pole as the pole area increases, thereby maintaining the torque constant as above described. I have secured a similar effect in changing from 4 poles to 2 poles, by changing from a Y-connection with each branch comprising two circuits in parallel to a delta connection with each branch comprising two circuits in parallel which produces a change in electromotive force per coil in the ratio of one to $\sqrt{3}$. Here again the iron of the stator is designed for the smallest number of poles.

The chart Figs. 10, 11 and 12 are charts of the conductors of the motor, diagrammatically shown in Fig. 4 and they show that in each slot there are two coil sides. The coil sides in the bottom of the slot are indicated at the right hand side of the spaces separated off by heavy lines to indicate a slot and the coil sides at the top of each slot are indicated at the left hand side of the spaces separated off by heavy lines to indicate a slot. The number of first phase coil sides per pole is equal to $\frac{C}{PF}$ where C is the total number of coil sides 48; P is the number of poles; and F the number of phases. Therefore, the number of coil sides of a given phase is for 8 poles, two per pole; for four poles, four per pole; and for two poles, eight per pole. As stated heretofore, it is necessary in order to secure the best operation of the motor that the effect of the conductors of each phase or a resultant equivalent to the effect of each phase should be confined to its proper proportion of the pole face, that is, in a three phase motor the effect of each phase should be confined to sixty electrical degrees of the pole face. In Figs. 10, 11 and 12, it does not appear that the conductors of each individual phase are confined to their proper proportion of the pole face but three effects bearing the same relation to one another as the three phases are nevertheless respectively confined to their proper proportions of the pole face, as will appear in the following statement. Considering for example the chart of coil sides shown in Fig. 12, it will be seen that between the lines A and B there are included twelve of the twenty-four slots or 180 electrical degrees of the stator. Beginning at the line B it will be seen that four slots each contain third phase coil sides at the top of the slot and second phase coil sides at the bottom of the slot. It will be seen that the next four slots contain first phase coil sides as the upper coil sides and third phase coil sides as the lower coil sides in the slot. The last four slots each contain second phase coil sides as the upper coil sides of the slot and first phase coil sides as the lower coil sides of the slot. Thus it will be seen that the corresponding coil sides, i. e. either the upper coil sides, which constitute one layer, or the lower coil sides, which constitute the other layer, are divided into a number of belts equal to the number of poles times the number of phases, and furthermore that the number of belts of each layer in each pole is equal to the number of phases and that each belt consists of coil sides of but one phase. Consequently, beginning at the line B the phase effect or resultant in each sixty electrical degrees of the pole face is the same as though each 60 electrical degrees contained only coil sides respectively of the first, second and third phase except that the three effects each produced by conductors of two phases will each be out of phase the same amount (90 electrical degrees) respectively with each of the three effects of segregated conductors, and of less intensity ($\sqrt{3:2}$). Therefore the expression "phase effect" is employed to designate the effect produced in either manner in each portion of the pole face, there being as many portions as there are phases. Thus, while in one case, namely, the case in which the speed ratio is 3 to 1, I group together coil sides belonging to the same phase without interspersing with them at any speed coil sides of any other phase, in the other case, where the speed ratio is 2 to 1 and the coil pitch is different from the pole pitch, I combine two coil sides of different phases in one slot to get a resultant effect which is the same as though I had used coil sides of the phase only in that slot, except that where the impressed electromotive force remains constant, the magnitude of each resultant is not equal to the algebraic sum of the effects of coil sides of the same phase and the three resultants will be respectively the same amount out of phase with the three original phases. In both cases I secure a uniform distribution of each phase across its proper proportion of the pole face, and without having interspersed within that proper zone of each phase effect the influence of any other phase effect whether due to the undesirable presence of a conductor of the wrong phase or of conductors giving a wrong resultant. Thus I produce at various speeds a flux distribution similar to that of corresponding single speed motors, having the same respective speeds, in which the coil pitch bears a similar ratio of length to the pole pitch.

In Figs. 10, 11 and 12 it appears that in certain slots the instantaneous direction of current flow is in opposite directions in the two conductors. Just as in single speed motor this will act to prevent the formation of the so-called "third harmonic" in the rotating field.

Each pole of a motor of the class described must have the effect of each phase acting upon it, or, in other words, it must have a phase effect corresponding to each phase. A three phase motor must have acting on each pole a phase effect corresponding to the first phase, another phase effect corresponding to the second phase and a third phase effect corresponding to the third phase. These various phase effects may be produced by conductors of the same phase, or by producing a resultant phase effect by combining conductors of other phases. Thus, in my motor I produce phase effects in both ways but I confine or concentrate each phase effect to its own correct proportion of the pole face; and where I produce a phase effect by combination of other phase conductors I have the conductors of the different phases substantially in the same relative arrangement across the pole face for all the different numbers of poles formed by changes of connections, except that the number of conductors per phase per pole changes inversely as the number of poles. Fig. 1 shows the windings of a three phase motor with a three to one speed ratio embodying certain features of my invention to the effect that a motor of two and six poles respectively can be produced by the windings shown in Figure 1; Figures 5 and 6 indicate the distribution of the flux in the windings in the cases of four and twelve pole motors, (Figure 5 in the case of a 4-pole motor; and Figure 6 in the case of a 12-pole motor). three phase, 3 to 1 speed reduction connected as shown in Figure 2; Figures 7, 8 and 9 indicate the flux distribution in the windings in the cases of motors of two, six and ten poles, respectively, of two phase, 3 and 5 to 1 speed reduction connected as shown in Figure 3; and Figures 10, 11 and 12 indicate the flux distribution in the cases of motors of two, four and eight poles, respectively, of three phase, and 2 and 4 to 1 speed reduction, connected as shown in Figure 4. The flux distributions shown in Figures 5 to 12, inclusive, are the same flux distribution inherent in any single speed motor of number of poles and phase corresponding to the above named number of poles and phases. My motor will perform the same as a corresponding single speed motor, as already explained. It is apparent therefore, as indicated in Figures 1 to 12 inclusive, that, in accordance with my invention, a multi-speed, multi-phase motor may have its conductors so connected as to produce N, $\frac{N}{3}$ and $\frac{N}{5}$ poles or N, $\frac{N}{2}$, and $\frac{N}{4}$ poles. In all of these motors the conductors carrying the same phase in each pole are divided into groups and these groups have the same relative arrangement within the pole for all said numbers of poles, the only change occurring in any group being that the number of conductors per phase, i. e. per group, varies inversely as the number of poles. In other words, in any one of these motors, the conductors of which are shown in Figs. 1 and 5 to 12, each pole comprises as many portions as there are phases in the impressed electromotive force, and when certain phases are found in given portions for one number of poles they will be found in corresponding portions for the other numbers of poles and the conductors carrying those phases will be arranged in the same manner in each portion for all numbers of poles except that the number of conductors per phase varies inversely as the number of poles. This uniform distribution of conductors throughout all numbers of poles results in a flux distribution which is substantially sinusoidal, the sine curve being altered merely by having its outline somewhat squared instead of smoothly rounded. The flux distribution is, therefore, symmetrical with respect to any pole and the flux of one pole is symmetrical with respect to other poles.

The result is that at all speeds a uniformity of flux distribution is attained which is comparable to the flux distribution of a single speed motor of each respective speed and having coils, the pitch of which bears the same relation to the pole pitch. Thus, as in single speed multi-phase motors, one phase may be opened at any speed so as to give a single phase winding at that speed.

While it has been proposed to have three phases in each slot in a multi-speed multi-phase motor the resultant of two phases is approximately 85% of the algebraic sum of the effect of two phases whereas the resultant of three phases is only ⅔, approximately, of the algebraic sum of the effect of three phases. And thus the number of additional turns for compensation is also greater where there are three phases in each slot. Furthermore, the greater depth of a slot having three coil sides results in greater magnetic leakage which is in turn increased at low speeds and by the greater number of turns necessary. Moreover, in the construction having three phases in each slot, the relation of coil pitch to pole pitch varies at different speeds so that compensation for one speed is improper at another speed. The standard construction for single speed motors is based on having two coil sides per slot so that my invention is applicable to existing constructions, and does not require the special construction wherein three coil sides are in each slot.

Fig. 18 is a diagram showing how I vary the connections of the groups of coils forming the stator winding in order to secure two, four and eight pole arrangements. Each straight line curve represents a group of one or more coils permanently connected. Each group consists of coils which are 180 $n$ electrical degrees apart for all numbers of poles, $n$ being any integer. Thus coils in every thirteenth slot around the stator are connected together and twelve such groups are therefore formed. The result of this is that corresponding coils of each group, for example the first of each group, are brought together on a stator and placed in adjacent slots. Each twelve adjacent slots of the stator includes 12 coils, one which belongs to each of the 12 groups.

In the diagram the abscissas are electrical degrees displacement between groups for the different numbers of poles and the ordinates are pole numbers. Thus for the highest speed having P poles, a pole comprising 180 electrical degrees, must have distributed across it twelve groups of coils and these coils must be divided among the three phases so that the phase effect of each coil is located within its own proper 60 electrical degrees of the pole face. For 2P poles there are half as many groups belonging to each phase for each pole. For 4P poles there are one-quarter as many groups of each phase for each pole. Thus it is seen that the first group remains constantly connected to the first phase. The second group remains in the first phase for a change from P to 2P poles and changes to the second phase on a change to 4P poles.

By following the line representing each group it is apparent how it is shifted from phase to phase to secure P, 2P, 4P poles, and by considering the number of electrical degrees displacement of the groups it is apparent when the connections of the group must be reversed in changing speed for this must occur whenever the displacement passes $(2n+1)$ 180 electrical degrees.

It is obvious that a similar diagram could be drawn to show the changes in connections of the various groups of coils in producing P, 2P and 5P poles.

The number of conductors brought out to the controller which varies the connections to produce different numbers of poles depends upon the number of phases, the number of speed changes and the ratios of these speed changes, but is independent of the number of coils and the number of poles. However, in the diagrams I have shown in each case the maximum number of leads that must be brought out to effect the speed changes described. In actual practice, when the number of speed changes and the ratios of those changes have been ascertained, the number of leads brought out may be reduced by making permanent internal connections.

In the foregoing description there are set forth details of connecting the conductors of two and three phase motors for several speeds where the coils are full pitch or the equivalent thereof at all speeds, and the details of connecting conductors of a three phase motor for several speeds so that the difference between the coil pitch and the pole pitch, namely, $\Theta$, is plus or minus 60 electrical degrees at all speeds. But if the different numbers of poles have been decided upon or if the difference between coil pitch and pole pitch, namely, $\Theta$, has been decided upon, the formulæ above given and the tables derived therefrom may be utilized to select respectively, the pitch difference $\Theta$ or the numbers of poles which may be employed in order that the pitch difference will be the same for all numbers of poles. In designing single speed motors, coils differing in pitch from the pole pitch have been used and an important object of my invention is the design of multi-phase windings and connections therefor, whereby the winding will produce different numbers of poles in which the arrangement of conductors and the distribution of flux will be the same as in single speed motors having the same relation of coil pitch to pole pitch and respectively producing the same numbers of poles as those produced by the different connections made in accordance with my invention. When the pitch difference, $\Theta$, has different values respectively in different motors, the relative arrangement of conductors of the different phases across the pole face will be different from the arrangement described in detail above, but the principle of my invention is involved so long as the relation of pole pitch to coil pitch remains the same at all speeds and the performance at each speed is the same as would be obtained from single speed motors respectively having the same speeds and the same pitch relation.

While I have illustrated and described specific embodiments of my invention, I do not intend that it shall be limited to these embodiments but intend that it shall be defined by the hereto appended claims.

What I claim as new and desire to secure by Letters Patent is:

1. A winding for a slotted member of a multi-speed alternating current motor, comprising a plurality of counterpart coils arranged to have not more than two coil sides per slot and adapted for connection in different relations to produce different numbers of poles, the corresponding coil sides of the winding being, on each of the different speeds, divided into a number of belts equal to one-half the number of poles times the number of phases of the source of supply times the number of coil sides per slot, each of said belts consisting of coil sides of but one phase.

2. A winding for a slotted member of a multi-speed alternating current motor, comprising a plurality of counterpart coils arranged to have two coil sides per slot and adapted for connection in different relations to produce different numbers of poles, the corresponding coil sides of the winding being, on each of the different speeds, divided into a number of belts equal to the number of poles times the number of phases of the source of supply, the number of said belts in each pole being equal to the number of phases and each of said belts consisting of coil sides of but one phase.

3. A winding for a slotted member of a multi-speed alternating current motor, comprising a plurality of uniformly overlapping counterpart coils adapted for connection in different relations to produce different numbers of poles, the coil sides of said coils being divided into two layers and each layer consisting of the corresponding coil sides of all the coils, each of said layers being, on each of the different speeds, divided into a number of belts equal to the number of poles times the number of phases of the supply circuit, the number of belts of each layer in each pole being equal to the number of phases and each of said belts consisting of coil sides connected in one phase only.

4. A winding for a multi-speed alternating current motor, comprising a plurality of counterpart coils arranged to have two coil sides per slot and adapted for connection in different relations to produce different numbers of poles, the coil pitch being, for all said different numbers of poles, equal in electrical degrees to an amount different from one hundred and eighty by a constant, plus three hundred and sixty multiplied by a whole number.

5. A winding for a multi-speed alternating current motor, comprising a plurality of uniformly overlapping counterpart coils arranged to have two coil sides per slot and adapted for connection in different relations to produce different numbers of poles, the pitch of said coils being so chosen that, for all said numbers of poles, the vector sum of the voltages induced in the coil sides of any coil bears the same relation to the said voltages, both as to magnitude and as to phase angle.

6. A winding for a slotted member of a multi-speed alternating current motor, comprising a plurality of counterpart coils adapted for connection in different relations to produce different numbers of poles, the corresponding coil sides of the winding being, on each of the different speeds, divided into a number of belts equal to the number of poles times the number of phases of the source of supply, the number of said belts in each pole being equal to the number of phases and each of said belts consisting of coil sides connected in but one of the phases and the coil pitch being, for all said different numbers of poles, equal in electrical degrees to an amount different from one hundred and eighty by a constant, plus three hundred and sixty multiplied by a whole number.

7. A winding for a slotted member of a multi-speed alternating current motor, comprising a plurality of counterpart coils adapted for connection in different relations to produce different numbers of poles, the corresponding coil sides of the winding being, on each of the different speeds, divided into a number of belts equal to the number of poles times the number of phases of the source of supply, the number of said belts in each pole being equal to the number of phases and each of said belts consisting of coil sides connected in but one of the phases and the pitch of said coils being so chosen that, for all said numbers of poles, the vector sum of the voltages induced in the coil sides of any coil bears the same relation to the said voltages, both as to magnitude and as to phase angle.

8. A stator winding for a three phase two speed alternating current motor having $N$ and $\frac{N}{3}$ poles, comprising a plurality of uniformly overlapping counterpart coils having a coil pitch equal to the pole pitch for $\frac{N}{3}$ poles and arranged to have two coil sides per slot, said coils being adapted for connection in different relations to produce the two said numbers of poles, the coil sides in each phase in each pole for each number of poles occupying a belt of sixty electrical degrees.

9. A multiphase alternating current motor having its conductors connected in groups and means for connecting said groups in different relations without changing the number of phases of the motor to produce different numbers of poles in each of which the effect of each phase is confined to its respective proportion of each pole for all said numbers of poles.

10. A multiphase alternating current motor having its conductors connected in groups and means for connecting said groups in different relations without changing the number of phases of the motor to produce different numbers of poles in each of which the effect of each phase is confined to its respective proportion of each pole for all said numbers of poles, and uniformly distributed over said proportion of pole.

11. A multiphase alternating current motor having its conductors connected in groups and means for connecting said groups in different relations without changing the number of phases of the motor to produce different numbers of poles setting up substantially sinusoidal and equal flux distribution for all numbers of poles.

12. A multiphase, multi-speed induction motor comprising conductors connected into nine groups, means to alter connections between the groups to produce different numbers of poles, one group of conductors remaining in the same phase and having its connections unreversed, one group of conductors remaining in the same phase and having its connections reversed and one group of conductors being shifted to a different phase.

13. A multiphase, multi-speed alternating current motor having conductors connected to form coils the length of which bears such a relation to the length of a pole of the lowest number of poles, that each coil embraces equivalent proportions of a pole for different numbers of poles, and means for connecting said coils to produce said different numbers of poles wherein the phase effects of each pole are confined to their respective proportion of each pole at said different numbers of poles.

14. A multiphase, multi-speed alternating current motor having conductors connected to form coils the length of which bears a certain relation to the length of a pole of the lowest number of poles, and means for connecting said coils to produce different numbers of poles for which said coils embrace equivalent proportions of a pole for said different numbers of poles and wherein the phase effects of each pole are confined to their respective proportion of each pole at said different numbers of poles.

15. In a multi-speed, multiphase motor, a plurality of conductors and means for connecting said conductors in different relations respectively producing different numbers of poles, all said conductors being equally divided among all the phases for all said relations, and all conductors belonging to each phase in one relation being divided into equal groups for connection in a second relation, wherein one group remains in the same phase, one group is located in a second phase and one group is located in a third phase.

16. In a multi-speed, multiphase motor, a plurality of conductors and means for connecting said conductors in different relations respectively producing different numbers of poles, all said conductors being equally divided among all the phases for all said relations, and all conductors belonging to each phase in one relation being divided into equal groups for connection in a second relation, wherein one group remains in the same phase, one group is located in a second phase and one group is located in a third phase, the direction of current flow in one of said groups remaining the same in both relations.

17. In a multi-speed, multiphase motor, a plurality of conductors and means for connecting said conductors in different relations respectively producing different numbers of poles, all said conductors being equally divided among all the phases for all said relations, and all conductors belonging to each phase in one relation being divided into equal groups for connection in a second relation, wherein one group remains in the same phase, one group is located in a second phase and one group is located in a third phase, the direction of current flow in one of said groups located in a different phase in said second relation remaining the same in both relations.

18. In a multi-speed, multiphase motor, a plurality of conductors and means for connecting said conductors in different relations respectively producing different numbers of poles, certain of said conductors being located in each phase in a first relation, and certain of said conductors in one phase in said first relation being located when connected in a second relation, some in the same phase, some in another phase and some in a third phase, the direction of current flow in the conductors shifted to one of the other phases in the second relation remaining the same in both relations.

19. In a multi-speed, multiphase motor, a plurality of conductors and means for connecting said conductors in different relations respectively producing different numbers of poles, said conductors being connected in groups a plurality of which are located in each phase in each relation, the groups in one phase in a first relation being located in a second relation, certain in the same phase, certain in another phase and certain in a third phase.

20. In a multi-speed, multiphase motor, a plurality of conductors and means for connecting said conductors in different relations respectively producing different numbers of poles, said conductors being connected in groups a plurality of which are located in each phase in each relation, the groups in one phase in a first relation being located in a second relation, certain in the same phase, certain in another phase and certain in a third phase, the direction of current flow remaining the same in one of said groups in both relations.

21. In a multi-speed, multiphase motor, a plurality of coils, and means for connecting said coils in different relations without changing the number of phases of the motor respectively producing different numbers of poles, the coil pitch bearing the same effective relation to the pole pitch in all said relations.

22. In a multiphase, multi-speed, alternating current motor, a plurality of coils of equal pitch, and means for connecting said coils in different relations without changing the number of phases of the motor respectively producing different numbers of poles, the pole pitch bearing the same effective relation to the coil pitch in all said relations.

23. In a multi-speed, multiphase motor, a plurality of coils, and means for connecting said coils in different relations without changing the number of phases of the motor respectively producing more than one set of poles, each pole bearing the same effective pitch relation to said coils in all said relations.

24. In a multi-speed, multiphase motor, a slotted core member, a plurality of coils arranged on said core member with a coil side in each slot, and means for connecting said coils in different relations without changing the number of phases of the motor respectively producing more than one set of poles, the coil pitch bearing the same effective relation to the pole pitch in all said relations.

25. In a multi-speed, multiphase, alternating current motor, a slotted core member, a plurality of coils arranged on said core member with a coil side in each slot, and means for connecting said coils in different relations without changing the number of phases of the motor respectively producing different numbers of poles, the flux distribution being symmetrical in each pole in all said relations.

26. In a multi-speed, multiphase, alternating current motor, a slotted core member, a plurality of coils arranged on said core member, with a coil side in each slot, means for connecting said coils in different relations without changing the number of phases of the motor respectively producing different numbers of poles, the flux distribution being symmetrical and substantially sinusoidal in all said relations.

27. In a multi-speed, multiphase, alternating current motor, a plurality of coils of equal pitch, and means for connecting said coils in different relations without changing the number of phases of the motor respectively to produce more than one set of poles, the pitch of which for all said numbers of poles bears the same effective relation to the pitch of said coils.

28. In a multi-speed, multiphase motor, a slotted core member, a plurality of coils arranged on said member with coil sides in each slot, means for connecting said coils in different relations without changing the number of phases of the motor respectively producing different numbers of poles, each pole comprising a number of portions equal to the number of phases within which, for all said numbers of poles, the coil sides carry current of only one phase.

29. In a multi-speed, multiphase motor, a slotted core member, a plurality of coils arranged on said member with coil sides in each slot, means for connecting said coils in different relations respectively producing several pole numbers, each pole comprising a number of portions equal to the number of phases within which, for all said numbers of poles, the coil sides carry current of only one phase.

30. In a multi-speed, multiphase alternating current motor, a slotted core member, a plurality of conductors in said slots, means for connecting said conductors in different relations without changing the number of phases of the motor respectively producing different numbers of poles, conductors in each pole and carrying the same phase being segregated in groups, groups of conductors carrying different phases having the same relative arrangement within each pole in all said relations, the number of conductors per group varying inversely as the number of poles, the conductors in each slot carrying less than the total number of phases.

31. In a multi-speed motor, a plurality of coils, and means for connecting said coils in different relations without changing the number of phases of the motor respectively to produce different numbers of poles, said coils being connected into a given number of groups when connected to produce any of said numbers of poles, each pole, for all said numbers of poles, comprising equal portions, equal in number to said given number of groups, within each of which the coil sides belong to less than the total number of said groups.

32. In a multi-speed, multiphase motor, a plurality of conductors and means for connecting said conductors in different relations without changing the number of phases of the motor respectively producing different numbers of poles, all said conductors being equally divided among all the phases for all said relations, and all conductors belonging to each phase in one relation being equally divided among all the phases in a second relation, said conductors being connected into coils bearing equivalent pitch relations to said poles in all said relations.

In testimony whereof, I have signed my name to this specification.

JACOB D. LEWIS.